(12) United States Patent
Siegel et al.

(10) Patent No.: US 7,451,055 B2
(45) Date of Patent: Nov. 11, 2008

(54) METHOD AND SYSTEM FOR MEASURING ENERGY SAVINGS RESULTANT FROM IMPROVEMENTS MADE TO A STRUCTURE

(75) Inventors: Jeffrey M. Siegel, New York, NY (US); Garrett W. Fienberg, New York, NY (US)

(73) Assignee: Intellicoat Technologies, Inc., New York, NY (US)

( * ) Notice: Subject to any disclaimer, the term of this patent is extended or adjusted under 35 U.S.C. 154(b) by 0 days.

(21) Appl. No.: 11/695,185

(22) Filed: Apr. 2, 2007

(65) Prior Publication Data

US 2008/0243421 A1 Oct. 2, 2008

(51) Int. Cl.
*G06F 19/00* (2006.01)

(52) U.S. Cl. .................................... 702/136; 705/1

(58) Field of Classification Search ................ 702/136, 702/182–185; 705/1
See application file for complete search history.

(56) References Cited

U.S. PATENT DOCUMENTS

| | | | |
|---|---|---|---|
| 5,717,609 A | 2/1998 | Packa | |
| 6,933,007 B2 | 8/2005 | Fensel | |
| 6,968,295 B1 | 11/2005 | Carr | |
| 7,089,089 B2 | 8/2006 | Cumming et al. | |
| 2002/0010563 A1* | 1/2002 | Ratteree et al. | 703/2 |
| 2003/0009401 A1 | 1/2003 | Ellis | |
| 2004/0009319 A1 | 1/2004 | Zanchetta et al. | |
| 2005/0028539 A1 | 2/2005 | Singh et al. | |
| 2005/0064094 A1 | 3/2005 | Wojtysiak et al. | |
| 2005/0064175 A1 | 3/2005 | Azari et al. | |
| 2005/0065743 A1 | 3/2005 | Cumming et al. | |
| 2005/0137921 A1 | 6/2005 | Shahriari | |
| 2005/0143865 A1 | 6/2005 | Gardner | |
| 2005/0194455 A1 | 9/2005 | Alles | |
| 2005/0209905 A2 | 9/2005 | Ness et al. | |
| 2005/0222715 A1 | 10/2005 | Ruhnke et al. | |
| 2005/0238848 A1 | 10/2005 | Fensel et al. | |
| 2005/0288394 A1 | 12/2005 | Rothman et al. | |

FOREIGN PATENT DOCUMENTS

WO    WO2005095528    10/2005

OTHER PUBLICATIONS

EPA, "The Roofing Comparison Calculator", available at http://roofcalc.cadmusdev.com.
Doe, "Cool Roof Calculator," Ver. 1.2, available at www.ornl.gov/sci/roofs+walls/facts/CoolCalcEnergy.htm.
Doe, "Cool Roof Calculator," Ver. 2.0, available at www.ornl.gov/sci/roofs+walls/facts/CoolCalcPeak.htm.
Mark S. Graham, "Roofwise—Version 2.0", Professional Roofing, Mar. 2003.

* cited by examiner

*Primary Examiner*—Edward Raymond
(74) *Attorney, Agent, or Firm*—Fox Rothschild LLP; Mord Michael Lewis

(57) ABSTRACT

A method and related system for determining energy savings that result from improvements made to a structure includes auditing the structure before the improvements are made to create a mockup of a section of the unimproved structure. The structure is then fully improved, and the mockup is disposed near a region of the improved structure that is to be monitored. The mockup may be thermally isolated from the improved region. An energy-related value, such as temperature, is then measured from the mockup and from the improved region of the structure. The mockup provides a baseline value, while the improved region provides a post-improvement value. Utilizing these measured values, the energy savings resulting from the improvement made to the structure can be determined.

24 Claims, 10 Drawing Sheets

METHOD AND SYSTEM FOR MEASURING ENERGY SAVINGS RESULTANT FROM IMPROVEMENTS MADE TO A STRUCTURE

FIELD OF THE INVENTION

The present invention relates generally to energy-savings measurements and methods related thereto. More specifically, a method is disclosed for accurately determining the savings associated with reduced heat gain through an improved structure, and using such determinations to predict energy cost savings resultant from the improvement.

BACKGROUND OF THE INVENTION

As energy costs continue to rise, coupled with a growing environmental awareness amongst the average consumer, an increasing interest in energy-saving methods has become apparent. To meet this interest, numerous energy services companies (ESCOs) offer potential clients plans for reducing energy-related costs in the home, office, factory, etc. For purposes of the following, an ESCO may also include a contractor or any other organization or individual that agrees to improve a structure. Many of these plans involve structural improvements being made to the building, and the costs of these improvements can be quite high. To provide an incentive for such capital improvements, ESCOs may agree to pay for the actual improvements in exchange for a portion of the resultant energy savings over a number of years.

Energy savings may be simply counted as: savings=(energy costs without the improvements)−(energy costs with the improvements). The first term of this energy-savings equation may be truly measured before the improvements are made to the structure, but thereafter becomes a hypothetical or simulated value. The second term may be hypothesized before the improvements are made, but thereafter becomes a real value that can be measured. The simple problem is, the two terms cannot both be measured as non-hypothetical values at the same time.

Because an accurate determination of the energy savings is essential to both the ESCO and the customer of the ESCO, a great deal of time and thought has gone into calculating the two terms in the savings equation. By way of example, U.S. Pat. No. 6,968,295 to Carr discloses a method and related system for auditing energy-usage at a facility, such as a grocery store. A plethora of data points concerning energy usage of the facility are identified, monitored and fed into a predictive algorithm running on a computer. The predictive algorithm is tuned until it outputs a computed energy-usage value that matches, within tolerable error, the measured energy-usage value of the facility. Thereafter, hypothetical changes to the facility may be fed into the model, which then outputs the expected energy savings from such changes. A drawback of the '295 patent, however, is that the value for the predicted energy-savings is only as good as the underlying predictive algorithm, and there is thus an inherent uncertainty as to whether actual energy savings will match the predicted value for those savings.

U.S. Pat. No. 5,717,609 to Packa et al. recognized this problem, and disclosed another method and related system to remedy it. The '609 patent discloses retrofitting a building, but leaving a small portion of the structure in its original state to provide the so-called baseline measurements, which are the measurements that provide the first term in the savings equation. Under the '609 patent, putative baseline measurements made with the small, unimproved portions of the structure could be had at the same time and under the same environmental conditions as their post-improvement counterparts. The '609 patent would thus appear to solve the dilemma of the energy-savings equation, allowing real (i.e., non-hypothetical), simultaneous measurements of both pre- and post-improvement parameters. However, it is believed that these small, unimproved portions do not, in fact, behave as they would if the entire structure were unimproved. Being surrounded by, and thermally interacting with, the improved portions of the structure, the unimproved portions do not mimic results that would be had from a fully unimproved structure. Hence, despite the appearance of accuracy, the baseline measurements obtained in the '609 patent are, in fact, incorrect. Additionally, customers generally do not like having one or more sections of their buildings being unimproved, but would rather that structure be improved in its entirety.

SUMMARY OF THE INVENTION

To alleviate the above-indicated problems, the present invention provides a method and related system for determining energy savings resulting from improvements made to a structure.

In one aspect, a method for computing energy cost savings resultant from an improvement being made to a structure is disclosed. The method comprises measuring a post-improvement energy value from an improved region of the structure, measuring a baseline energy value from a mockup of an unimproved region of the structure, and then utilizing the post-improvement energy value and the baseline energy value to compute an energy savings value. In various embodiments, the measured energy values are temperature values used to determine heat gain into or out of the structure. In one embodiment, the improved region is an external surface of the structure, and the mockup has an external surface that is substantially equivalent to an external surface of the structure before improvement. In a specific embodiment, the mockup is disposed over the improved external surface of the structure, being thermally isolated from this improved region and near where the post-improvement energy value is measured. The baseline and post-improvement energy values may be measured at approximately the same time to provide maximum environmental consistency between the measurements.

In another aspect, a system is disclosed for measuring and computing energy cost savings that result from an improvement being made to a building. The system includes a mockup of an unimproved region of the structure, a first sensor for measuring a baseline energy value from the mockup, and a second sensor for measuring a post-improvement energy value from an improved region of the structure. In various embodiments, the sensors record temperature values for an external surface of the improved structure, and a corresponding region on the mockup, so that the first sensor obtains a baseline temperature value, and the second sensor obtains a post-improvement temperature value. In certain embodiments, the mockup is disposed over the improved external surface of the structure, and further includes a thermal isolator disposed between the mockup and the improved external surface of the structure. In a specific embodiment, the mockup is disposed near the second sensor. The external surface of the mockup may be substantially identical in composition or color to the corresponding external surface of the structure before the structure was improved. In some embodiments, the system further includes a recording device for recording at least a value associated with the first sensor and the second sensor.

DETAILED DESCRIPTION

Figure 1:
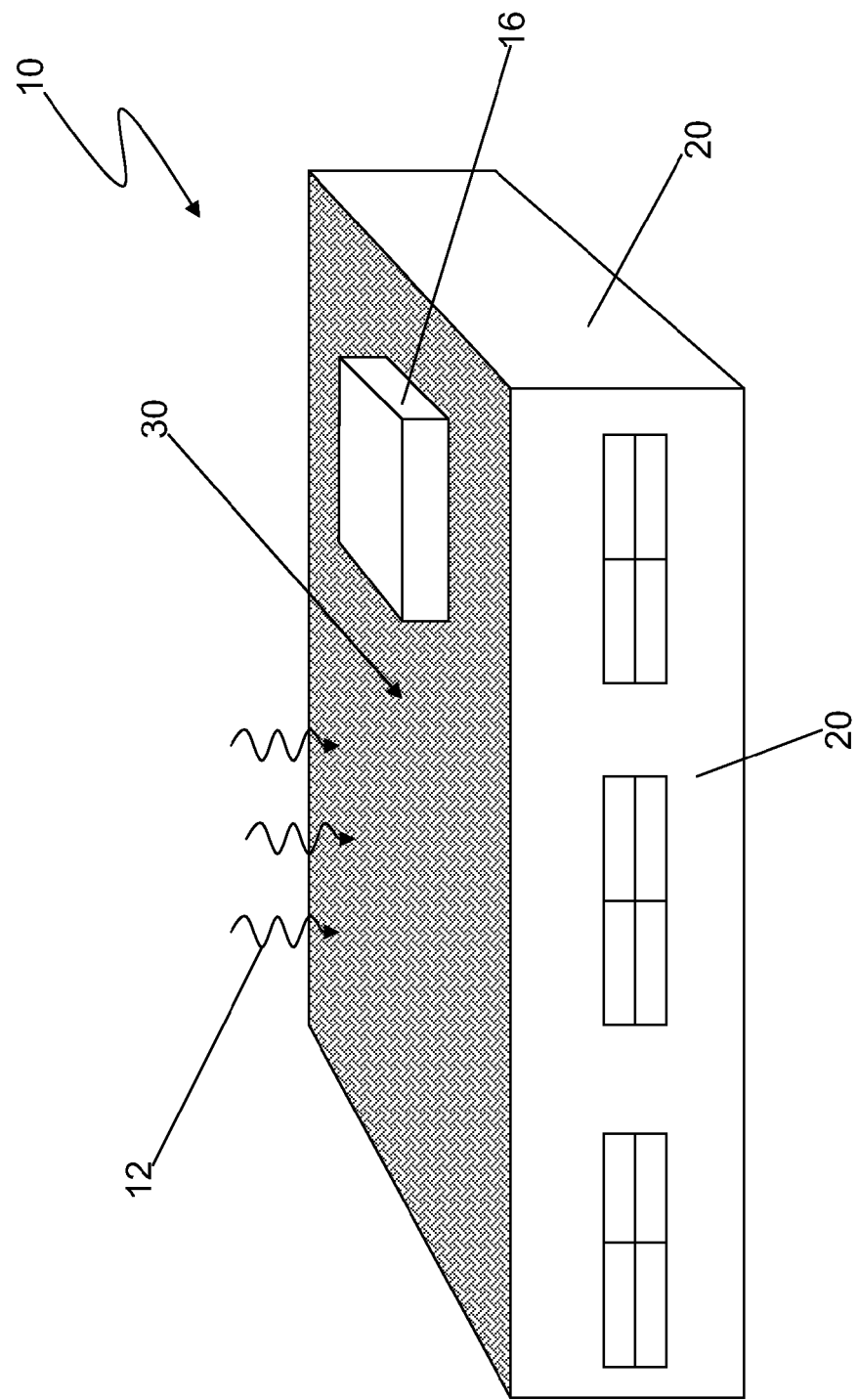
FIG. 1 is a simplified perspective view of an unimproved structure.

FIG. 1 is a simplified perspective view of an unimproved structure 10, such as a warehouse, factory or the like. The unimproved structure 10 has a plurality of exterior surfaces, including walls 20 and a roof 30. These exterior surfaces 20, 30 interact thermally with the environment, and may therefore absorb thermal energy 12; this is particularly true of the roof 30, which is subject to heating from incident solar radiation, and may reach temperatures of up to 190° Fahrenheit, and even beyond.

Figure 2:
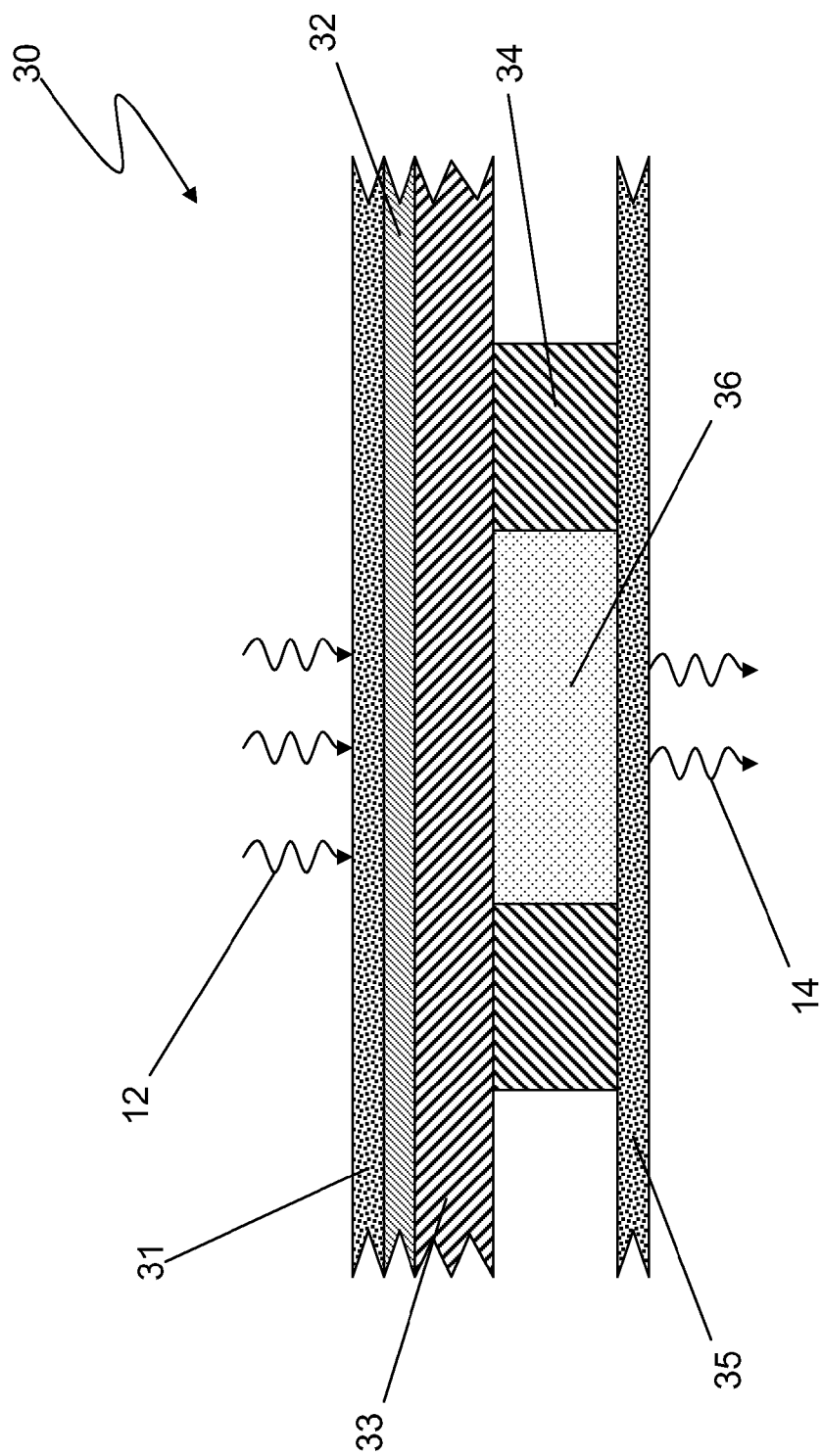
FIG. 2 is a cross-sectional view of a roof depicted in FIG. 1.

As known in the art, there are numerous possible designs for the roof 30, and a very simplified cross-sectional view of one possible design is shown in FIG. 2. The roof 30 will typically have a layered structure, which may include a protective top layer 31, such as gravel, shingles, a membrane or the like; a sealing layer 32 for keeping out liquid and vapor water, such as a membrane or the like; a deck 33, which may be, for example, plywood corrugated metal, or concrete; supporting sections 34, such as beams, rafters or the like, typically of wood or metal, and a ceiling surface 35, which may be, for example, sheetrock. Between the ceiling surface 35 and base layer 33 there may be a thermal insulation layer 36, such as fiberglass. Insulation board, though not shown, may also be present in the roof 30.

Each layer in the roof 30 may act as a barrier to prevent the ingress and egress of thermal energy 12, and may be accorded a corresponding thermal resistance value, or R-value. The total thermal resistance of the roof 30 is the sum of the individual R-values of the layers 31-36. High temperatures present on the exterior surface of the roof 30 may result in significant heat, or very little heat, propagating through the roof 30 and into the interior regions of the structure 10, primarily because of the existence, or lack thereof, of insulating layer 36. Basic thermodynamic principles allows the amount of heat entering or leaving the structure 10 over a period of time "t" to be computed. This may be called the heat gain, and is given by:

$$\text{Heat Gain} = U * A * \Delta T * t \quad \text{(Eqn. 1)}$$

In the above, "U" is the thermal conductivity of the roof system 30, and is the inverse of the total thermal resistance R (R-value) for the roof system 30; "A" is the area of the roof surface; and "ΔT" is the temperature difference across the roof surface. ΔT may be represented as $(T_{out} - T_{in})$, where $T_{out}$ is the average temperature of the outer surface of the roof over a period of time, such as during the operational time of an air conditioning unit 16, and $T_{in}$ is the average temperature inside the structure 10 during this time. A positive value for the heat gain indicates that thermal energy 14 is entering into the interior regions of the structure 10. Heat gain is typically measured in British Thermal Units (BTUs).

To keep the temperature inside the structure 10 at a constant, desired value, the heat 14 must be removed from the structure 10. This is typically done by way of an air conditioning unit 16, which expends a considerable amount of energy, generally electrical energy, removing the heat 14. To determine the amount of energy required to remove this heat 14, the effective Energy Efficiency Ratio (EER) of the existing air conditioning system 16 may be measured or otherwise obtained, such as from the manufacturer of the air conditioning unit 16. The EER measures the amount of energy required by the air conditioning system 16, which may be measured in watt-hours, to remove a unit of heat, which is typically measured in BTUs. To determine the kilowatt-hours (kWh) used by the air conditioner 16 to remove the heat gain 14, the heat gain is simply divided by (EER/1,000):

$$\text{kWh of energy used} = \text{BTUs of Heat Gain}/\text{EER}/1{,}000 \quad \text{(Eqn. 2)}$$

Combining equations 1 and 2 yields:

$$\text{kWh of energy} = U * A * (T_{out} - T_{in}) * t / \text{EER}/1{,}000 \quad \text{(Eqn. 3)}$$

Figure 3:
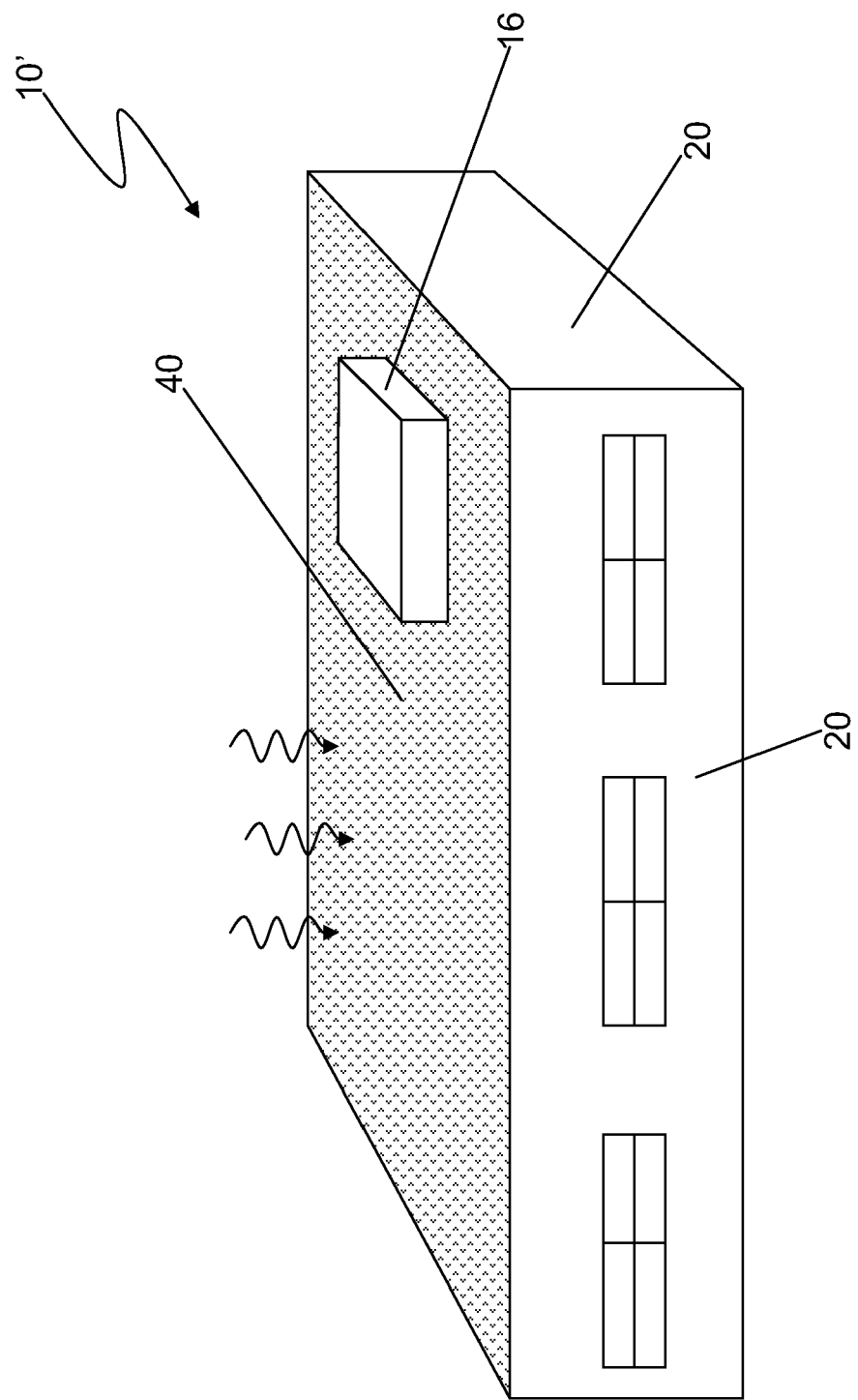
FIG. 3 is a simplified perspective view of the structure of FIG. 1 with an improved roof.

By changing any of the parameters in Eqn. 3 it is possible to reduce the energy used by the air conditioning system 16 over a unit of time "t" to maintain the desired temperature $T_{in}$ within the structure 10. A particularly efficacious way of reducing the energy consumption, besides increasing the internal temperature $T_{in}$, is to reduce the exterior surface temperature $(T_{out})$ of the roof 30. One method for reducing $T_{out}$ of the roof 30 is to provide a new layer to the roof 30 that reflects back incident radiant energy, and which is also highly emissive. Such layers may be applied, for example, like paint. An example of such a suitable coating is disclosed in United States Patent Application Publication No. 2005/0288394 to Rothman et al., entitled "Insulative, Emissive, and Reflective Coating," which is incorporated herein by reference. An example of the structure 10' improved with such a new coating is depicted in FIGS. 3 and 4.

Figure 4:
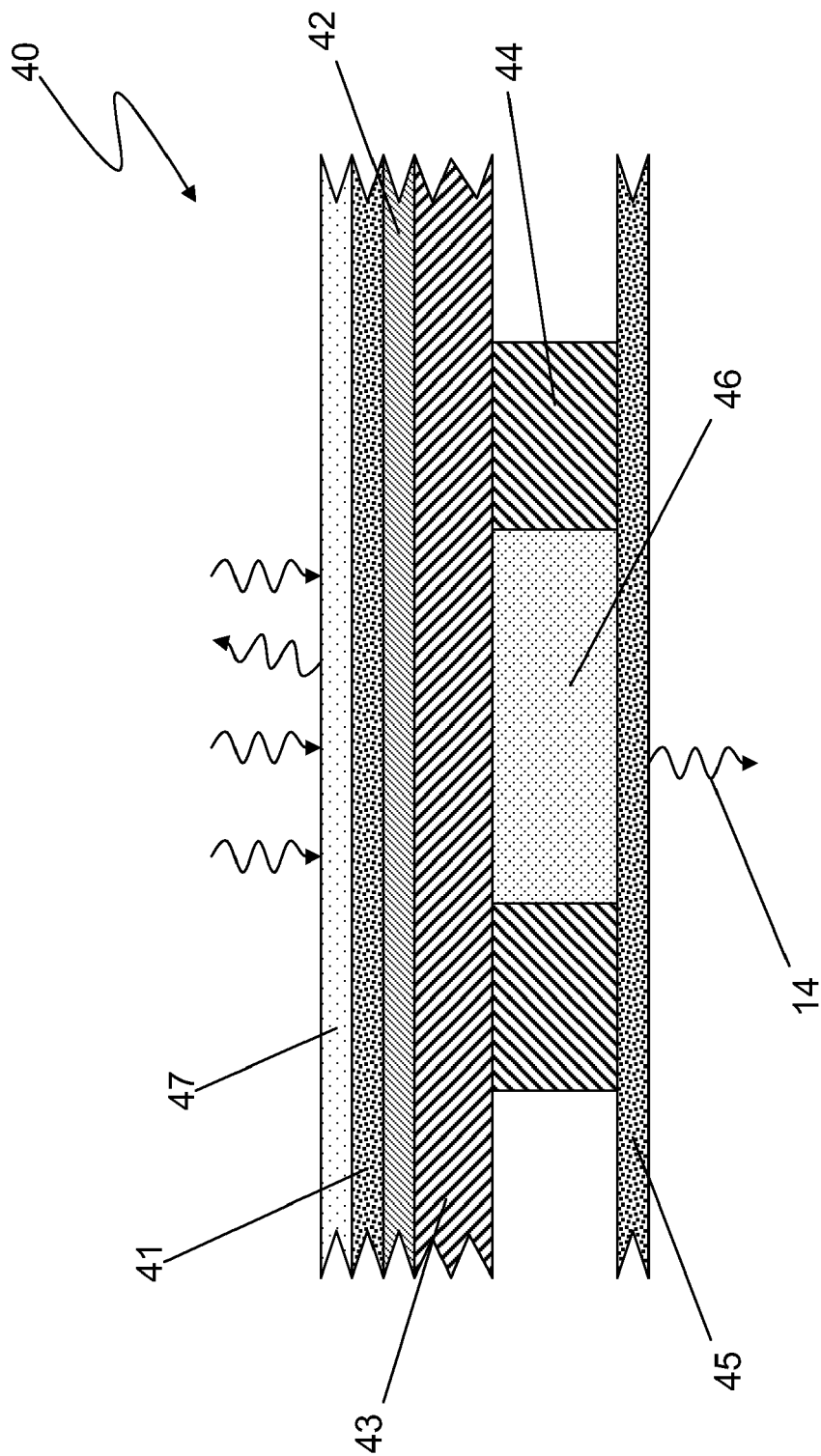
FIG. 4 is a cross-sectional view of the improved roof of FIG. 3.

As shown in FIG. 4, a new roof 40 may include some or all of the layers from the unimproved roof 30, but additionally has a new top layer 47. This top layer 47 is both highly reflective of incident solar radiation, while being highly emissive in wavelengths designed to maximize radiation of heat away from the improved structure 10'. The top layer 47 helps to reduce the heat gain 14 by being highly reflective and emissive; the top layer 47 thus provides a considerably cooler surface than is provided by the top layer 31 of the unimproved roof 30, and thus significantly reduces the temperature value $T_{out}$. Other properties of the top layer 47 may also assist in conducting heat through the roof system 40.

As a first step to determine the energy savings resulting from the improved roof 40, an auditing procedure is performed upon the unimproved structure 10 to determine the various parameters needed to plug into Eqn. 3 and other mathematical functions, described later. These parameters form a first, unimproved parameter set for the structure 10. By way of example, Measurement and Verification (M&V) protocols outlined in The International Performance Measurement and Verification Protocol, Volume 1 (1997), included herein by reference, may provide parameters, engineering calculations, and measurement suggestions that may be useful for auditing purposes. Of particular interest is the roof conductance U-value for the unimproved roof 30. As indicated above, the U-value for the unimproved roof 30 is the inverse of the total R-value of the roof 30. The total R-value of the unimproved roof 30 is simply the sum of the R-values of each layer 31-36 forming the roof 30. Various auditing methods may be employed to identify the layers 31-36 present in the roof 30. For example, a core sample of the roof 30 may be made, and the layers within the core identified. Alternatively, external observations may be employed, together with a review of the building plans for the unimproved structure 10 and interviews with any party responsible for the maintenance and upkeep of the structure 10.

Once the layers 31-36 in the unimproved roof 30 have been identified, the R-values for these layers 31-36 may be determined. Typically, this is done by referring to tables accepted in the field that list the R-values for various materials; for example, the American Society of Heating, Refrigeration, and Air Conditioning Engineers (ASHRAE) provides R-value tables that may be used to determine the individual R-values of each layer 31-36 within the unimproved roof 30. These individual R-values are then added together to provide an initial total R-value for the unimproved roof 30. This initial total R-value may be discounted due to, for example, age, water damage, wear, or structural peculiarities of the roof 30. For example, the roof 30 may have piping, ducting or other elements that pass through the various layers 31-36 of the roof 30, and which therefore offer a route along which thermal energy may more easily conduct. Such discontinuities through the roof 30 tend to diminish the overall resistance of the roof 30, and so may be accounted for by reducing the initial total R-value of the roof 30 to provide a final total R-value for the roof 30. The ESCO and the customer may agree between themselves, for example, on how much to discount the initial total R-value so as to yield a final R-value for the roof 30. The conductivity U-value used in Eqn. 3 is then the inverse of this final, total R-value for the roof 30.

Another parameter of interest in the unimproved structure 10 that relates to potential energy savings as indicated by Eqn. 3 is the area A of the roof 30. The instant discussion is made with specific reference to the roof 30, and hence the parameter A similarly refers to the area of the roof. However, one of reasonable skill in the art should readily recognize that more generally, the parameter A encompasses the surface area of the generally same surface type that is to be improved. Alternatively, if the improvement is being made to different surface area types, such as a roof and walls, or even different sections of roof that have differing roof types, separate calculations and measurements, as described herein, may be made individually for each surface type, each with its own set of parameters. While auditing the unimproved structure 10, the surface area A under consideration is measured, ideally to within the nearest square foot or less. In the instant example, as only the roof 30 is to be improved, the area A of the roof 30 is measured, down to the nearest square foot or less. Typically, the area A will not change between the improved and unimproved structures, and so need be measured only once. However, if the improvement to the structure 10 will involve changes to the surface area, then pre- and post-improvement measurements for A may be desirable.

Another parameter of interest in Eqn. 3 that an auditor may desire to collect is the EER of air conditioning units 16. Although the EER of air conditioning units 16 are generally available from the manufacturer, it may be desirable to verify this result. Additionally, it will be appreciated that the EER of the air conditioning unit 16 may vary as a function of the intake temperature of air into the unit 16, as well as the desired internal temperature $T_{in}$ of the structure 10. Hence, the EER may have one value that is used before the improvement is made to the structure, and another value that is used after the improvement is made. These EER values may, for example, be determined by the auditor, or stipulated by the customer. For example, the ESCO may use the EER as provided by the manufacturer of the air conditioning unit 16, but discount this value by a predetermined amount, such as one, if the unit 16 is positioned in a hot area, such as on a hot roof, of if the unit 16 is over a certain age, such a ten years.

Once the auditing procedure has been carried out on the unimproved building 10, improvements may be made to the structure that yield energy-savings, such as by providing the top layer 47 to reduce the heat gain 14 into the structure 10'. However, as described later, prior to making the improvements, it may be desirable to make certain energy-related measurements to develop energy savings projections. Once such measurements have been made, and the improvements are completed, another auditing procedure may then again be performed, similar to that done for the unimproved structure 10, to collect the various parameters needed for Eqn. 3 with respect to the improved structure 10', and so yield an improved parameter set. The improved parameter set may include many or all of the same values found within the unimproved parameter set, such as the U-value of the improved roof 40, the subsequent EER of the air conditioning unit 16, and the area, if changed, of the improved roof 40. Additionally, as noted above, the EER of the air conditioning unit 16 may be improved due to the reduced external temperatures provided by the improved roof 40.

Cost savings resultant from the improved roof 40 may be simply given as:

$$\text{savings}=(\text{energy costs without the improvements})-(\text{energy costs with the improvements}) \quad (\text{Eqn. 4}).$$

The first and second terms of Eqn. 4 both utilize values derived at least in part from Eqn. 3. However, the first term uses the unimproved parameter set, while the second term utilizes the improved parameter set. Of particular importance to Eqn. 3 is the term $(T_{out}-T_{in})$. $T_{in}$ may be considered a constant across the structure 10 in both its improved and unimproved states, as this is simply the desired internal temperature as set by the users of the structure 10. However, when an improvement involves, for example, the reflective top layer 47, the terms $T_{out}$ will very likely be different between the improved roof 40 and the unimproved roof 30. To utilize Eqn. 4 to determine the resultant savings, it is therefore necessary to simultaneously determine $T_{out}$ for the unimproved structure 10, and $T_{out}$ for the improved structure 10'.

Figure 5:
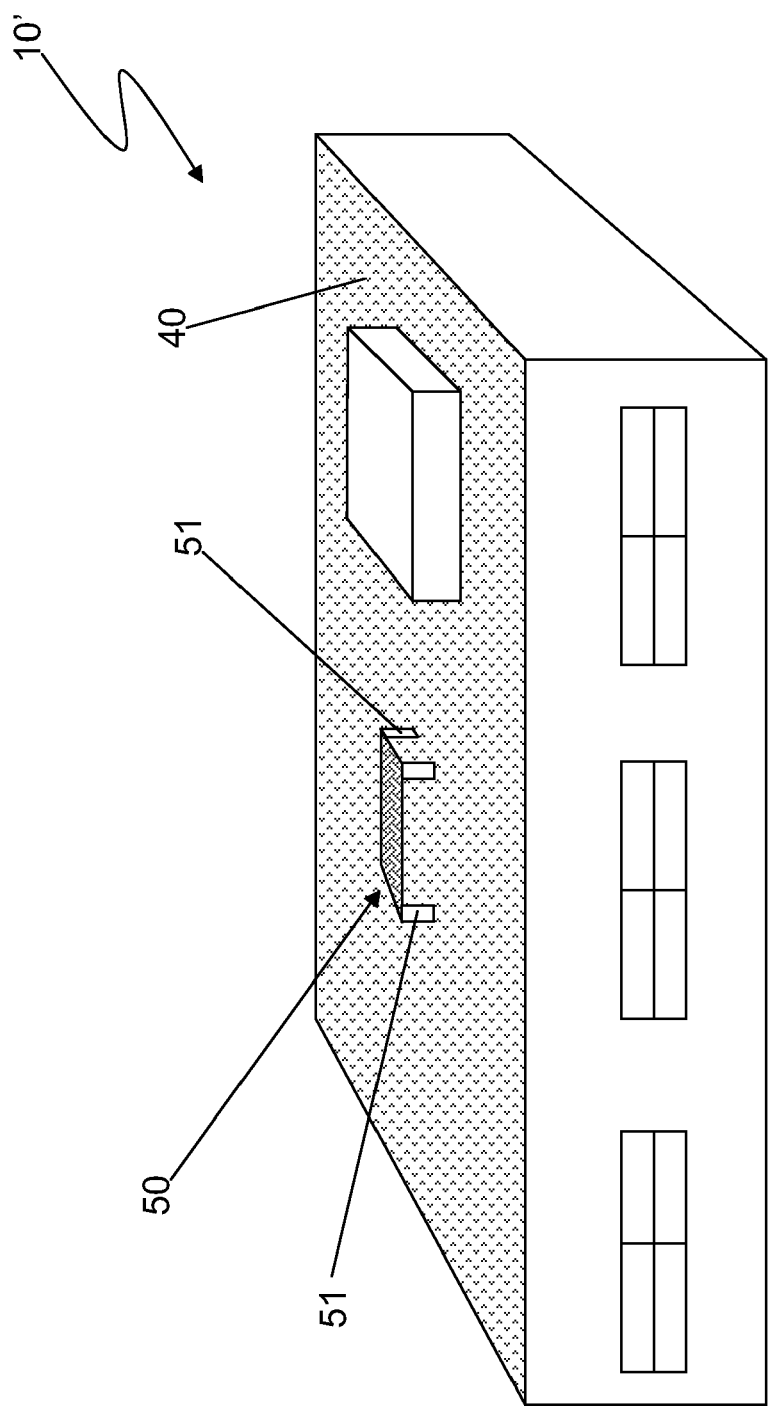
FIG. 5 is a perspective view of an embodiment savings measurement system utilizing a roof mockup installed on an improved roof.
Figure 6:
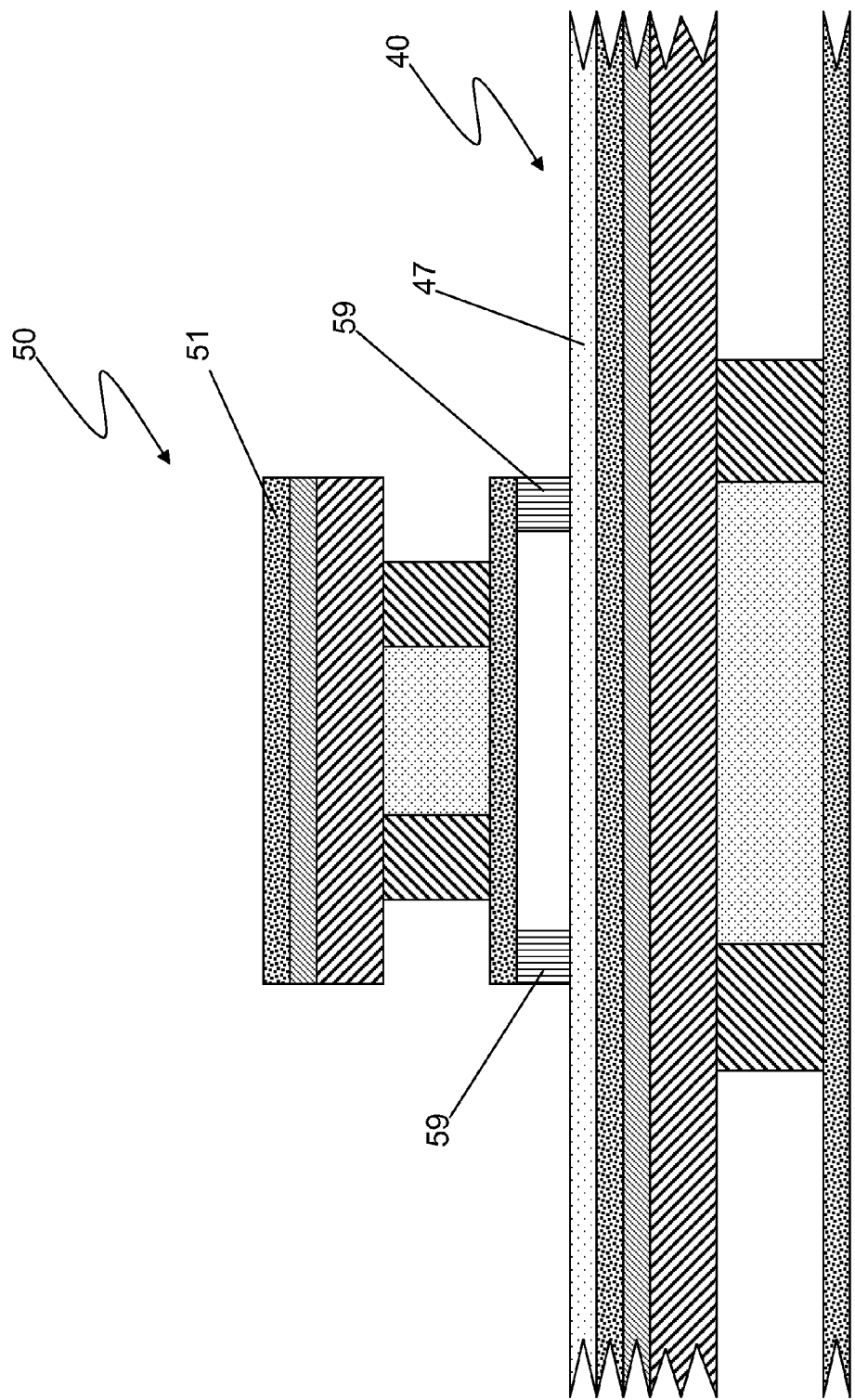
FIG. 6 is a side view of the roof mockup depicted in FIG. 5.

FIGS. 5 and 6 provide perspective and side views, respectively, of a system for determining the $T_{out}$ terms according to the invention method. A mockup 50 of the unimproved roof 30 is disposed over the fully-improved roof 40, and is used to obtain baseline (that is, pre-improvement) measurements. The mockup 50 is positioned so as to obtain baseline results under environmental and structural conditions that correspond as closely as possible to those of the corresponding post-improvement measurement results. All improvements are fully and completely made to the improved structure 10', including providing the entire roof surface 40 with the reflective top coating 47. To obtain baseline measurements for the heat gain 14 under conditions that are substantially identical to those of the unimproved roof 30, the mockup 50 may be disposed just above the improved roof 40, and near, such as within three feet of, the position where post-improvement measurement readings will be taken. Spacers 59 thermally isolate the mockup 50 from the rest of the fully improved structure 10', and in particular serve to thermally isolate the mockup 50 from the improved roof 40. The mockup 50 thus has no or minimal thermal interaction with the improved structure 10', and therefore behaves thermodynamically more like the unimproved roof 30. In particular, the region of interest whose temperature is to be measured for baseline purposes, such as the top surface 51 of the mockup 50, is not directly physically connected to, or contiguous with, its improved counterparts, i.e., the roof 40, and thus is not substantially affected by such improvements. The spacers 59 ideally have a very high R-value, and may be, for example, rubber supports that are about one half of an inch to about one inch in height. The mockup 50 is ideally placed as close as possible to the post-improvement measuring area without casting a shadow.

The mockup 50 ideally has a composition, color, reflectivity and emissivity that is similar to, or even identical to, the unimproved roof 30. For example, the mockup 50 may be structurally identical to a representative section of the unimproved roof 30. If it is impracticable to provide such a mockup 50, then the mockup 50 should ideally be constructed to react with the environment in a manner that mimics as closely as possible the unimproved roof 30. For example, the top surface 51 of the mockup 50 may be made from a material that is identical in composition and wear to the protective top layer 31 of the unimproved roof 30. Preferably, the top surface 51 of the mockup 50 has reflectivity and emissivity characteristics that match those of the top surface of the unimproved roof 30. Although the mockup 50 shown in FIG. 6 has a structure that is nearly identical to that of the unimproved roof 30, it will be appreciated that such structural identity of the mockup 50 is not required. For example, the mockup 50 may be formed from little more than the spacers 59 and the top layer 51, which is ideally of the same composition as the top layer 31 of the unimproved roof 30. The top surface 51 of the mockup 50 preferably has a surface area of at least one square foot. However, large sizes of the mockup 50 may be susceptible to lifting in severe winds.

To obtain the baseline temperature value $T_{out}$, the top surface 51 of the mockup 50 may be used. Any suitable temperature sensor known in the art may be used to take temperature readings of the mockup 50, and therefore obtain a baseline value for $T_{out}$. For example, a thermocouple may be physically attached to the top surface 51 of the mockup 50, or embedded within the top surface 51. Alternatively, a non-contact thermometer, such as a pyrometer, may be used to spot-read the temperature of the top surface 51. Similarly, to obtain the post-improvement temperature value $T_{out}$, the top surface 47 of the improved roof 40 may be used. Typically, the mid-point of the improved roof 40 is used for this measurement. In one aspect, a series of such temperature measurements may be made over an evaluation time and recorded to provide a performance database that can be used to compute energy-cost savings associated with the improved structure 10' over this evaluation time. The post-improvement measurements and the baseline measurements are preferably made at the same time so as to be maximally consistent with each other in terms of environmental conditions. However, small delays between the baseline and post-improvement measurement values may be acceptable, such as between a few seconds or a few minutes of each other.

Figure 7:
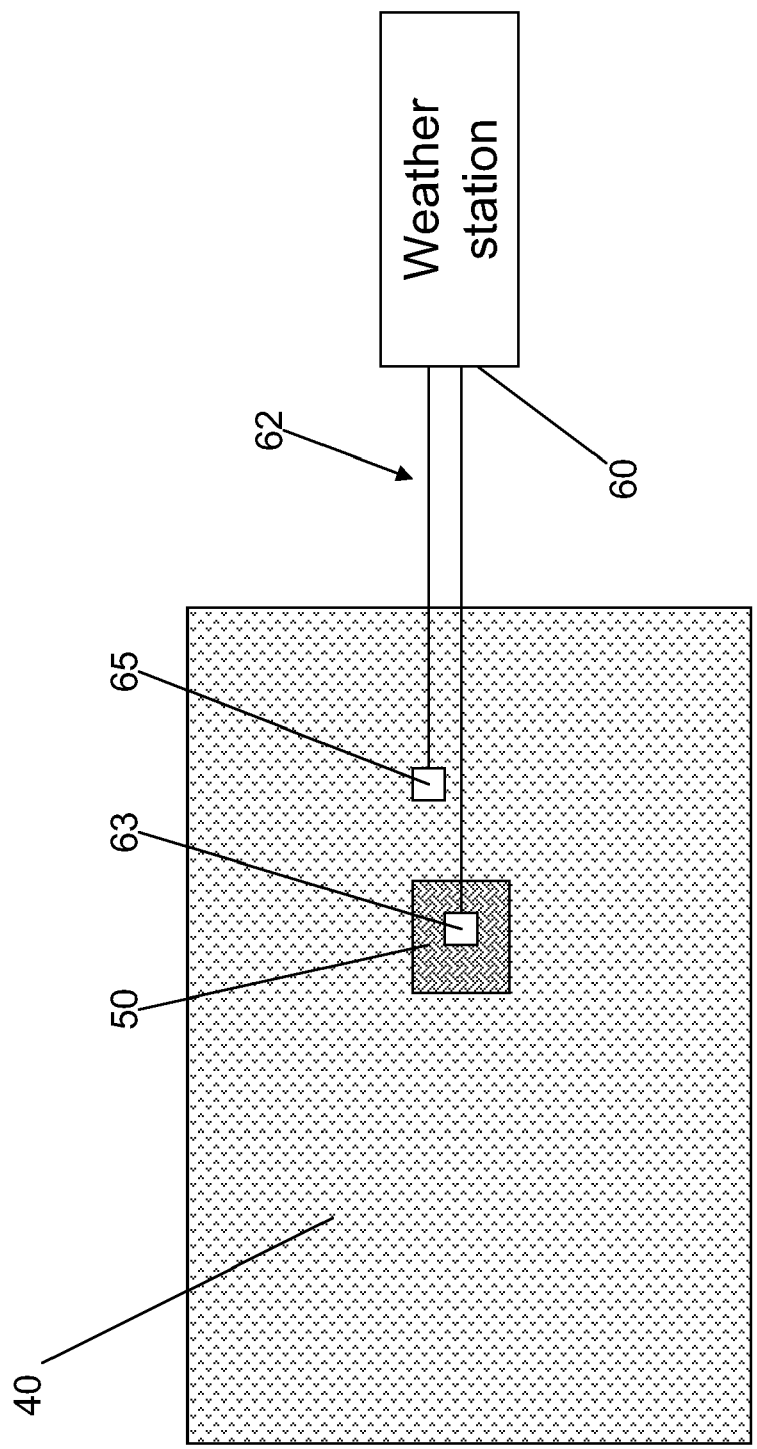
FIG. 7 is a top view of an embodiment savings measuring system.

To build such a performance database, in one embodiment the output of the temperature sensors recording the pre- and post improvement values for $T_{out}$ is periodically read and recorded during the entire measurement and verification (M&V) period. Any suitable method may be used to collect this M&V data, and one embodiment is depicted in FIG. 7.

The baseline temperature $T_{out}$ is provided by a first temperature sensor 63, which records the top surface 51 temperature of mockup 50 and sends this temperature to weather station 60 via a data link 62. The data link 62 may be provided by any method known in the art, and could be wired or wireless. Similarly, a second temperature sensor 65 records the surface temperature of the top of the improved roof 40, and forwards this temperature over the data link 62 to the weather station 60 to provide the post-improvement $T_{out}$ temperature. At periodic intervals, such as hourly, the weather station 60 records both temperatures, together with any other information that may be desirable to collect, such as the date, time, amount of solar radiation, ambient temperature and the like. The duration of the M&V period may vary. In other embodiments, the baseline and post-improvement M&V temperature data may be obtained, for example, by a technician performing manual readings according to a predetermined schedule. The first sensor 63 and second sensor 65 should be positioned so that the measurements being made correspond to each other as closely as possible in terms of environmental and structural conditions presented by the structure 10. For example, regions which may not be structurally consistent with each other for measurement purposes would be a region near a duct, and another region in an open area of the roof 40. Ideally, the sensors 63, 65 are placed in an open region of the roof 40, away from shade cast by other structures or equipment.

The M&V data collected by the weather station 60, or technician, may be processed daily, weekly, monthly or according to any other evaluation period deemed suitable by the ESCO and the customer, and thus determine the energy cost savings provided by the improved structure 10' during that evaluation period. The M&V period, over which the M&V data is collected, may therefore be sub-divided into numerous evaluation periods, or may be covered by a single evaluation period. To calculate the costs savings, the energy savings may first be computed, and based upon Eqn. 3 may be given as:

$$\text{Energy savings} = (U_{Pre} * A_{Pre} * \Delta T_{Pre} / \text{EER}_{Pre} - U_{Post} * A_{Post} * \Delta T_{Post} / \text{EER}_{post}) * t / 1000 \quad \text{(Eqn. 5)}$$

Within the minuend of Eqn. 5, $U_{Pre}$ is the conductivity U-value for the unimproved roof 30, as determined from the initial auditing procedure. Similarly, $A_{Pre}$ is the area of the unimproved roof 30, and $\text{EER}_{Pre}$ is the EER rating of the air conditioning unit 16 prior to improving the structure 10, both of which are determined during the pre-installation auditioning procedure. Measurement results obtained from the weather station 60 for the surface temperature of the mockup 50 may provide the term $\Delta T_{Pre}$, which is given by $(T_{out})_{Pre} - (T_{in})_{Pre}$. $(T_{out})_{Pre}$ is obtained from the first temperature sensor 63, which records the surface temperature of the mockup 50. $(T_{in})_{Pre}$ may, for example, be stipulated by the client, or may be simultaneously recorded by the weather station 60 (or technician) with a suitable sensor set to record the indoor temperature of the improved structure 10'; in the latter case, the value used for $T_{in}$ should correspond as closely as possible in date and time to that of $T_{out}$. Finally, the term "t" indicates the amount of time between the date and time of the current value of $\Delta T_{Pre}$ and the subsequent value of $\Delta T_{Pre}$. Alternatively, $\Delta T_{Pre}$ may be the average temperature during a predetermined measurement period "t", which may be, for example, during the hours of operation of the air conditioning unit 16.

Within the subtrahend of Eqn. 5, $U_{Post}$ is the conductivity U-value for the improved roof 40. $A_{Post}$ is the area of the improved roof 40, and $\text{EER}_{Post}$ is the EER rating of the air conditioning unit 16 operating within the improved structure 10'. Measurement results obtained from the weather station 60 for the surface temperature of the mockup 50 provide the term $\Delta T_{Post}$, which is given by $(T_{out})_{Post}-(T_{in})_{Post}$. $(T_{out})_{Post}$ is obtained from the second temperature sensor 65 recording the surface temperature of the improved roof 40. $(T_{in})_{Post}$ is generally the same value used for $(T_{in})_{Pre}$, since both $T_{out}$ values are typically recorded together. As in the minuend of Eqn. 5, $\Delta T_{Post}$ may be the average temperature over period "t", which may be the hours of operation of the air conditioning unit 16.

As the M&V data is collected on a regular basis, which in some embodiments may be throughout the evaluation period, a series of incremental energy savings may be calculated by iterating through the M&V data over the evaluation period with Eqn. 5. The weather station 60 may simply store raw M&V data for later processing to obtain these incremental results, or the weather station 60 may itself apply Eqn. 5 to the current and previous $T_{out}$ temperature measurements to generate a list of incremental energy savings results, which the weather station 60 may then store with or without the associated raw data. These incremental energy savings may be used to calculate the resultant cost savings to the ESCO customer, using any suitable method.

In one embodiment, knowledge of fluctuations in energy prices can be used when calculating the resultant energy cost savings over the evaluation period. Energy is typically priced as a number of pennies per kWh. Because energy rates can vary based upon the time of day, it may be desirable to take into account these fluctuations when computing the resultant cost savings. Since each incremental energy saving value obtained from Eqn. 5 may have associated with it a corresponding date and time (as recorded by the weather station 60 or technician), and as the cost of a kWh of energy may be obtained from the energy provider of the customer, each incremental energy savings value may be multiplied by its corresponding cost of energy at that time to obtain a monetary value for that incremental energy savings value, thereby yielding incremental monetary values. These incremental monetary values may be summed over the evaluation period to obtain the total energy cost savings provided by the improved structure 10'.

Alternatively, the total energy cost savings may be based upon the fully loaded price per kWh paid during the evaluation period. The fully loaded price of energy may be calculated by adding the dollar amount of all items of the utility bills related to then-current energy consumption during the evaluation period, and then dividing by the number of kWh used during the period. The incremental energy savings over the evaluation period may be summed together to get the total energy savings over the evaluation period, and this total may then be multiplied by the fully loaded price of energy to obtain the total cost savings resultant from the improved structure 10' over the evaluation period.

In an alternative embodiment, the M&V period may be shorter than the evaluation period. In this embodiment, M&V data is collected from the mockup 50 and the improved roof 40 over a relatively short period of time, and is then extrapolated to calculate resultant energy savings over the evaluation period. The M&V data collected by the weather station 60 or technician may further include meteorological details for each individual measurement, such as the amount of cloud cover present, the intensity of incident solar radiation, outside temperature, and humidity. The thermal characteristics of the mockup 50 and the improved roof 40 under these conditions, and with other parameters obtained during the auditing procedure, are then analyzed to generate mathematical models of the thermodynamic characteristics of the unimproved roof 30 and improved roof 40. These mathematical models may then be used to compute resultant energy savings over a much longer evaluation period, and may take into account changes in the weather over this evaluation period.

Figure 8:
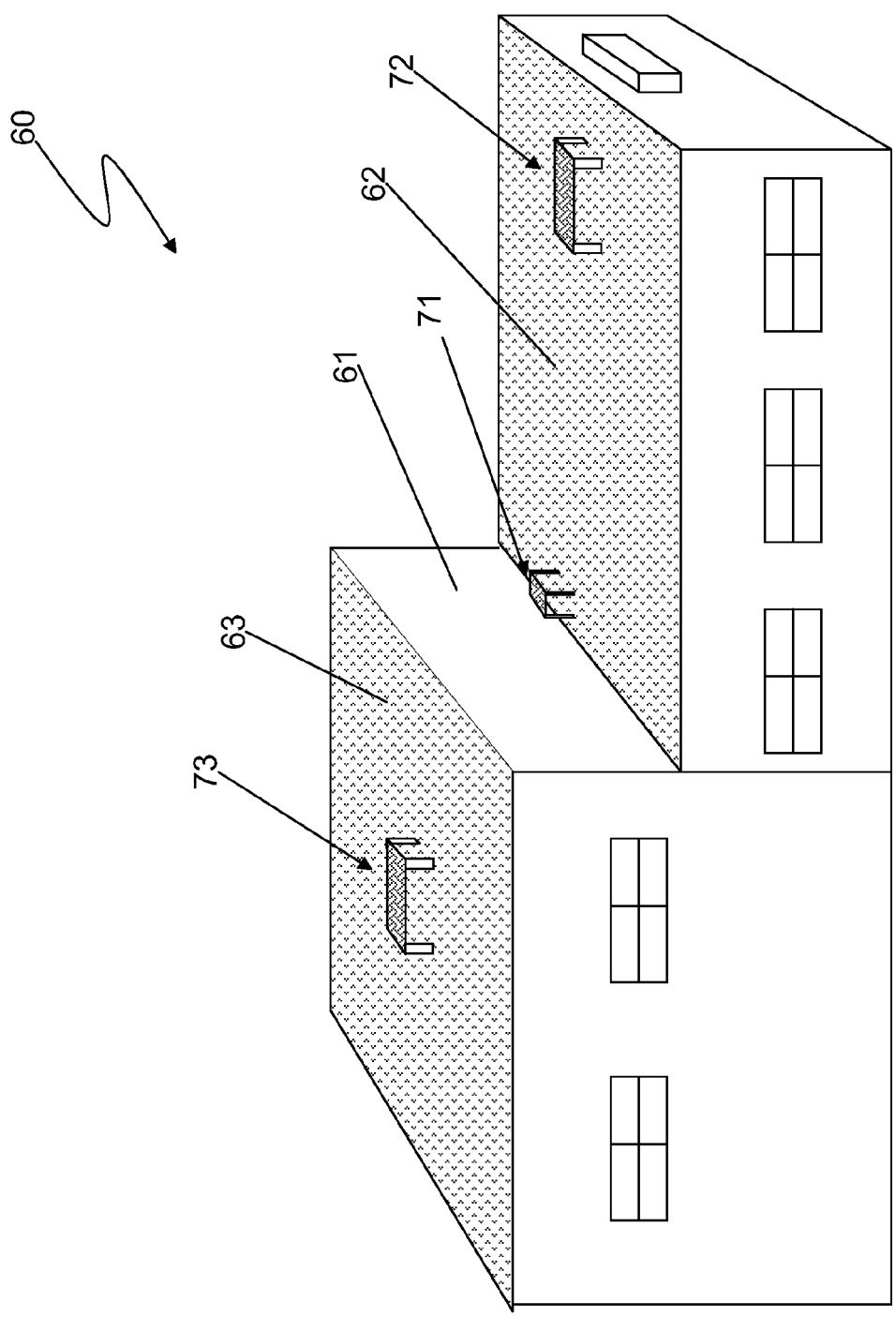
FIG. 8 is a perspective view of another embodiment savings measurement system utilizing multiple roof mockups installed on an improved roof.

Generally, the mockup 50 may be placed in a position that is representative of the entire roof 40; for example, if the roof 40 is primarily shaded, then the mockup 50 may be placed in a shaded location on the roof 40. It will be appreciated, however, that more than one mockup may be used to obtain baseline measurements. For example, as shown in FIG. 8, a structure 60 may have a relatively complicated roof geometry, in which some regions may receive more solar radiation than others, and in which walls may thermally interact with portions of the roof. To more accurately predict baseline heating profiles of such a roof, it may be desirable to position several mockups at strategic locations. For example, a first mockup 71 may be placed along an intersection between a lower roof portion 62 and the wall 61 of an upper roof portion 63. A second mockup 72 may be placed in a relatively open area of the lower roof portion 62, and similarly a third mockup 73 may be placed in a relatively open area of the upper roof portion 63. Temperature measurements of the improved roof 60 may also be made near each of the mockups 71-73 to obtain post-improvement data that corresponds to the pre-improvement data provided by the mockups 71-73. The data provided by the mockups 71, 72 may then be used to determine an average $T_{out}$ that is subsequently used to calculate the energy savings.

Figure 9:
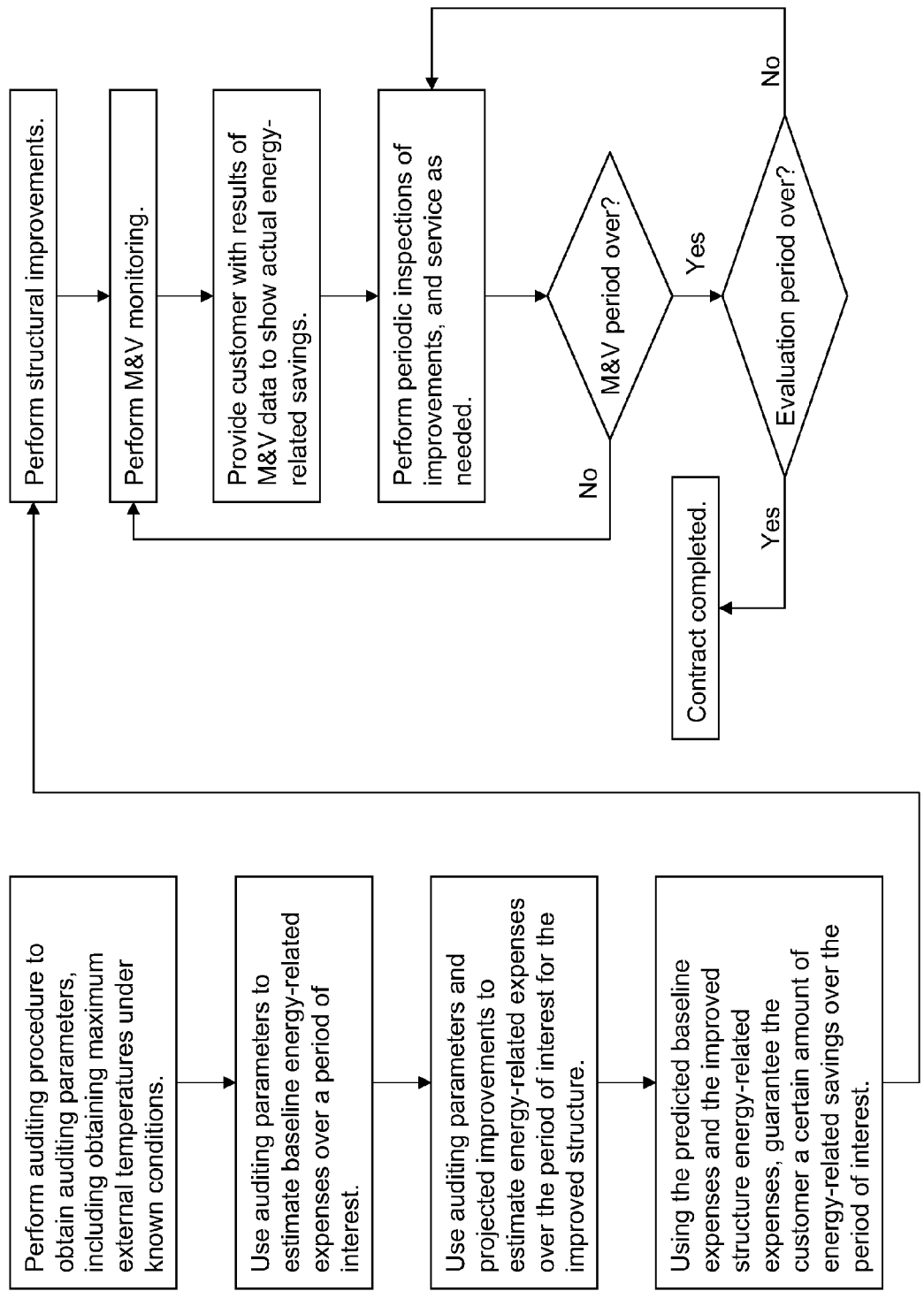
FIG. 9 is a flow chart for an embodiment method.

Embodiment steps for performing and managing improvements to a structure are shown in FIG. 9. The mockups and related methods of use described above are useful tools that an ESCO may employ to satisfy a customer that energy savings are being realized. These M&V tools are typically employed, however, after the improvements to the structure have been made. Getting the improvements made necessarily requires the permission of a willing customer. Getting customer permission to perform potentially substantial improvements to a structure requires motivating factors that more than outweigh any resulting inconvenience or expense. Of course, the primary motivating factor is the potential enjoyment of long-term savings from the improvement. If the ESCO can guarantee such savings to the customer, or provide other financial motivations, as is contemplated in certain embodiments, then what was a potential enjoyment becomes a certainty, and the motivation to make the structural improvements becomes that much stronger. The above-described M&V devices and techniques may then be employed to later prove to the customer that the savings that were guaranteed are now actually being realized, or to determine a payback amount to the ESCO.

For the ESCO to make a contractually binding financial incentive that the customer will enjoy at least a certain amount of energy savings over a period of interest, such as the evaluation or contract period, the ESCO should ideally, before any improvements are made, be able to make a good estimate of the energy savings resultant from a proposed improvement. The ESCO may use the auditing procedures described earlier to obtain the various parameters related to the unimproved structure, such as the area of a surface A that is to be improved, and the related thermal conductivity U. Additionally, the auditor may collect such information as the geographical location and orientation of the structure that is to be improved, the angle of inclination of the related surface A, and the average reflectivity and emissivity of the surface A.

With these parameters, and using known thermodynamic modeling calculations, it is possible to generate a purely mathematical profile or simulation of the thermal response of the unimproved structure under hypothetical temperature and incident solar radiation conditions. Based upon the orientation and location of the structure, and using publicly available meteorological data, such as from the National Oceanic and Atmospheric Administration (NOAA), it therefore becomes possible to predict or model the external temperature of the unimproved structure over the course of a period of time. For example, specific NOAA data may be used to predict the thermal response of the unimproved structure over the course of those specific days that the NOAA data covers. Alternatively, the NOAA data may be used to determine average meteorological conditions for each day of interest, and these average values may be used to compute the average thermal response of the unimproved structure over those days of interest. For example, the NOAA data provides so-called "cooling degree days" for various regions across the country, which indicates the number of degrees above 65° F. a particular day of the year is on average for that part of the country. These cooling degree days may be plugged into a thermodynamic simulation of the unimproved structure to determine how, on average, the unimproved structure behaves over the course of the period of interest. From this, the heat gain of the unimproved structure may be calculated, and then, based upon the cooling efficiency of the air conditioning unit, the thermodynamic characteristics of the unimproved structure, and optionally other factors (such as heat generated internally within the structure, the cost of energy as a function of date, time or both, and so forth), the energy costs associated with this heat gain may be computed.

Figure 10:
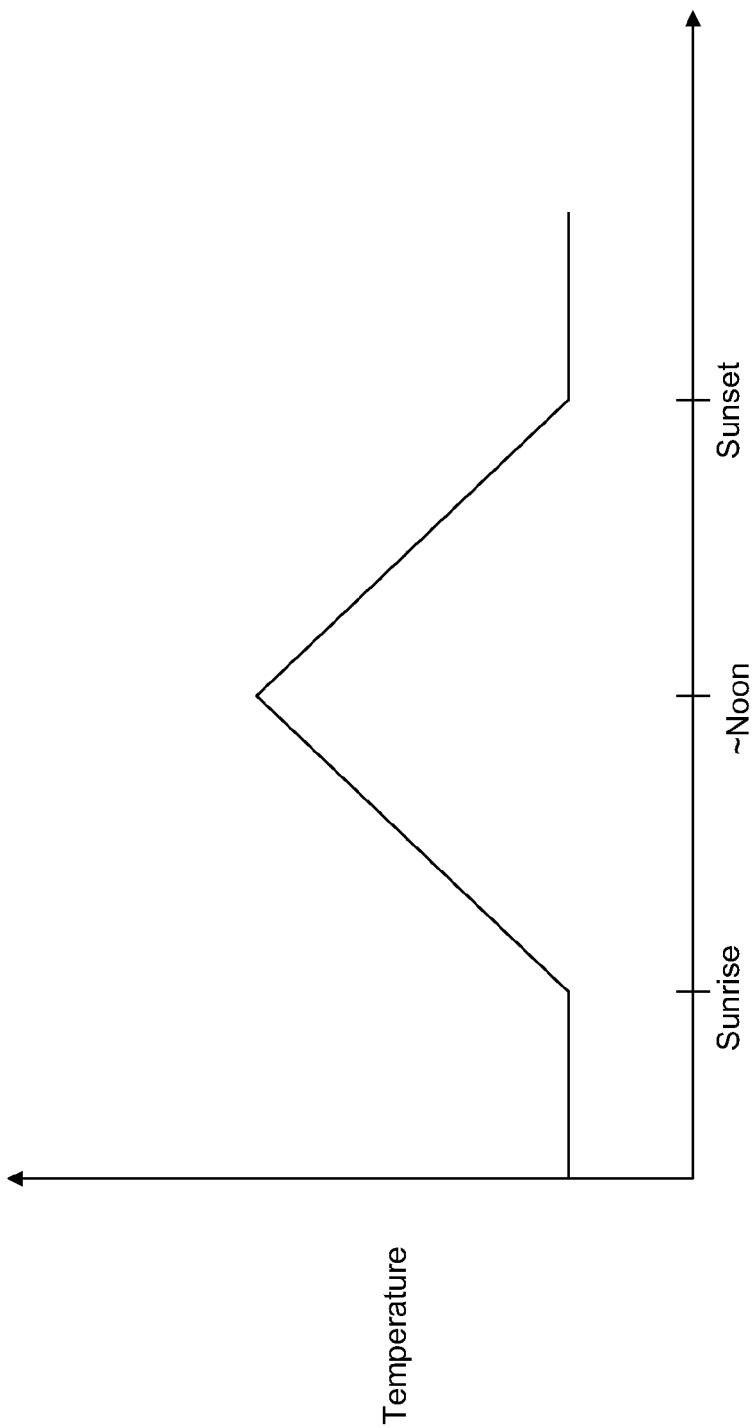
FIG. 10 is a graph showing approximated external temperatures as a function of time.

Although thermodynamic simulations may offer a good general idea of the response of the unimproved structure to various external conditions, it has been found that on-the-ground measurements taken under known conditions can significantly help improve calculations for estimating the thermodynamic response of the unimproved structure. Generally, it can be expected that the peak temperatures experienced by the unimproved structure will occur somewhere between noon and 2 pm. Shortly (such as an hour or two) after sundown, and before sunrise, it may be assumed that the external temperature of the unimproved structure is about the same as the ambient external temperature. As shown in FIG. 10, a simple approximation is to assume that the temperature of the unimproved structure rises and falls linearly over the course of the day, reaching its maximum near noon, and at night settles and remains at the average night temperature for that date of interest. The area under the graph in FIG. 10 provides the average external temperature of the unimproved structure. The area under the graph over a certain time period, such as during hours of sunlight, offers the average external temperature of the unimproved structure over that time period.

Because average nighttime temperatures can be obtained from meteorological data, if the peak temperature for the unimproved structure is measured, then the average temperature of the unimproved structure may be computed over any desired time frame. An auditing engineer may therefore visit the unimproved structure on at least one day, preferably between the hours of noon and 2 pm when the maximum temperature is expected, and record the external temperature of the unimproved structure. In particular, the auditing engineer may record the external temperature of the roof of the unimproved structure, or any other external surface that is expected to be subsequently improved. Additionally, the auditing engineer may record the meteorological conditions when the temperature measurement is taken, such as the amount of cloud cover, humidity, etc.

By taking more than one temperature measurement, the external temperature response of the unimproved structure as a function of time may be refined. For example, the auditing engineer may elect to take a temperature measurement every hour, from sunrise to sunset. These measurements may be taken manually, or they may be taken automatically, as with a weather station or the like. The resultant temperature measurement dataset may be used to extrapolate a curve that provides external surface temperature as a function of time. As with the simpler function shown in FIG. 10, the area under this curve may be used to determine the average external temperature of the structure over a time period of interest. Typically, this will be the operating hours of the structure, and more particularly, the operating hours of the air conditioning unit, such as between 8 am and 6 pm, or the like.

Using the average temperature for the unimproved structure during the hours of interest, as calculated above, a temperature adjustment factor for the unimproved structure may be obtained. The temperature adjustment factor may be given as:

Temperature adjustment factor=(Average temperature)/(cooling degree day). (Eqn. 6)

In Eqn. 6, the average temperature is the value extrapolated from the one or more temperature measurements made of the unimproved structure on a certain date, as described above. The cooling degree day may be obtained from meteorological data, such as from the NOAA, and indicates how many degrees above 65° F. the average temperature is on the date in question. For predictive purposes, the temperature adjustment factor for the unimproved structure may then be used to estimate the average temperature of the unimproved structure on another date, and is given by the following formula:

Average temperature=(Temperature adjustment factor)×(cooling degree day). (Eqn. 7)

In Eqn. 7, the temperature adjustment factor is the same value as was previously found using Eqn. 6; the cooling degree day may obtained from meteorological data, as previously indicated, and is the cooling degree day for the date in question. Using Eqn. 7, and publicly available meteorological data, it is possible to predict the average temperature of the unimproved structure on any desired date over any desired operating period. The heat gain and corresponding energy-related expenses may then be computed as well, using, for example, the formulas and methodologies explained earlier. This process may be iterated across successive days to span a period of interest, such as a month or a year, to predict the energy-related expenses of the unimproved structure over this period and provides an estimate for the baseline energy-related expenses.

Other factors may also be computed and used to extrapolate energy-related savings over the evaluation period. For example, during the M&V period, the cooling degree days may be recorded, as well as the amount of daily solar radiation. By computing the amount of energy savings over a period of interest, a solar radiation factor may be computed, which is given as:

Solar radiation factor=energy saved/solar insolation.

Similarly, a cooling degrees day (CDD) factor may be generated, which is given as:

CDD factor=energy saved/(cooling degree day).

Each of these factors may then be used, analogously to the temperature adjustment factor discussed above, to further extrapolate energy savings performance over the evaluation period. As previously explained, cooling degree days for any day of interest, or averages thereof, are publicly available, such as from NOAA. The same is true for incident solar radiation. Iterating these average values for particular days over the evaluation period, and using the above factors, additional refinements to the estimated energy-related savings are possible.

When an ESCO proposes an improvement to a structure, the ESCO generally has a good idea as to how the proposed improvements will affect the thermodynamic characteristics of the structure. For example, the improvements may increase the R-value of the structure in certain well-defined ways, or may modify the reflectivity or emissivity of one or more surfaces of the structure, such as the roof, walls, windows or the like. The ESCO will present to the customer a set of one or more changes to be made to the structure to improve the energy-efficiency of the structure. Whatever changes are made, or proposed to be made, to improve the structure, the ESCO should be able to estimate the heat gain of such a hypothetically improved structure, and thus should be able to estimate the resultant energy-related expenses of such an improved structure, utilizing the simulation techniques employed earlier.

By way of a specific example, when coatings, such as those disclosed in the previously-mentioned U.S. published application number 2005/0288394, are applied to external surfaces, the surfaces so treated rarely rise more than 7 degrees Fahrenheit above the ambient temperature; typically, the temperatures are between about 2 to 5 degrees, and more particularly between 3 to 5 degrees above ambient. The ESCO may thus assume that the average temperature of the improved roof on any day will never exceed, for example, 5 degrees above the average temperature for that day, which may be obtained from the cooling degree day value. That is, the ESCO may assume that the outside temperature $T_{out}$ for the improved structure is 5 degrees more than the cooling degree day for the date in question. The ESCO can estimate the heat gain of the improved roof for each day in question over the period of interest and hence predict the energy-related expenses of the improved structure over the period of interest.

The estimated energy-related expenses of the improved structure may be subtracted from the baseline energy-related expenses to provide the estimated energy-related savings over the period of interest. To encourage a customer to undergo the inconvenience and potential expense related to the proposed improvement, the ESCO may then guarantee the customer that, over the period of interest, the customer will realize at least a certain percentage (such as 80%, 90% or even 100%) of the estimated energy-related savings if the improvement is performed. Alternatively, the ESCO may agree to finance the costs associated with improving the structure in exchange for a percentage of the energy-related savings over a period of time, which may be, for example, several years. Assuming that suitably conservative auditing and estimation procedures have been used, this contractually binding agreement given for the benefit of the customer is a near certainty for the ESCO, and thus a relatively low-risk proposition. If the customer agrees to the improvements, the ESCO may begin work to improve the structure and turn the hypothetical improved structure into a reality. Once the structure has been improved in a manner as agreed to between the ESCO and the customer, the energy-related savings of which has been earlier predicted and guaranteed, the ESCO may use the M&V protocols discussed earlier to prove to the customer that the estimated energy-related savings are actually being realized with the improved structure.

The period of interest, which may be the period over which the ESCO guarantees energy-related savings, and which may also be the M&V period or longer than the M&V period, may cover a substantial amount of time, such as a year or more. During this time, it is possible that the performance of the improvements made to the structure may degrade. To ensure long-term satisfactory results, the ESCO may desire to periodically inspect and maintain the improvements made to the structure. For example, with continuing reference to the coating example discussed above, the ESCO may choose to inspect the roof 40 or siding treated with the coating 47 to verify that no stains, dirt, debris or other problems are degrading the thermal performance of the coating 47. If problems are found, the ESCO may opt to correct the problems to ensure the coating 47 performs optimally. For example, if the coating 47 is found to be covered in grime, the ESCO may wash the coating 47 to restore the reflectivity and emissivity characteristics of the coating 47. In this manner, the predicted energy-savings may be realized.

Although the invention herein has been described with reference to particular embodiments, it is to be understood that these embodiments are merely illustrative of the principles and applications of the present invention. For example, although specific reference has been drawn towards measuring the temperature of a roof, it will be appreciated that the instant invention is applicable to any external surface of any sort of structure. That is, the instant invention is not limited to roofs, but may also be applied to the sidewalls of such structures. Nor is the instant invention necessarily limited to buildings, but may also be applicable to other structures that may be improved, such as vehicles, ships, aircraft or the like. It is therefore to be understood that numerous modifications may be made to the illustrative embodiments, and that other arrangements may be devised without departing from the spirit and scope of the present invention as defined by the following claims.

What is claimed is:

1. A method for determining energy savings resulting from an improvement made to a structure, the method comprising:
    obtaining a physical mockup of an unimproved region of the structure;
    measuring a post-improvement energy value from an improved region of the structure;
    measuring a baseline energy value from the mockup; and
    utilizing the post-improvement energy value and the baseline energy value to compute an energy savings value.

2. The method of claim 1 wherein the improved region is an external surface of the structure, and the mockup has an external surface that is substantially equivalent to an external surface of the structure before the structure was improved that corresponds to the external surface of the improved region.

3. The method of claim 2 wherein the mockup is disposed over the improved external surface of the structure.

4. The method of claim 3 wherein the mockup is disposed near a measuring position used to obtain the post-improvement energy value.

5. The method of claim 3 wherein the mockup is thermally isolated from the improved region.

6. The method of claim 2 wherein the external surface of the mockup is substantially identical in composition and color to the corresponding external surface of the structure before the structure was improved.

7. The method of claim 2 wherein the mockup has substantially the same reflectivity and emissivity as the external surface of the corresponding external surface of the structure before the structure was improved.

8. The method of claim 1 wherein the post-improvement energy value and the baseline energy value are temperature values.

9. The method of claim 8 wherein the temperature values are obtained at approximately the same time.

10. The method of claim 1 further comprising:
performing an audit upon the structure prior to the structure being improved; and
constructing the mockup according to at least a result obtained from the audit.

11. A system for determining energy savings resulting from an improvement made to a structure, the system comprising:
a physical mockup of an unimproved region of the structure;
a first sensor for measuring a baseline energy value from the mockup; and
a second sensor for measuring a post-improvement energy value from an improved region of the structure.

12. The system of claim 11 wherein the improved region is an external surface of the structure, and the mockup has an external surface that is substantially equivalent to an external surface of the structure before the structure was improved that corresponds to the external surface of the improved region.

13. The system of claim 11 wherein the mockup is disposed over the improved external surface of the structure.

14. The system of claim 13 wherein the mockup is disposed near the second sensor.

15. The system of claim 13 further comprising an isolator disposed between the mockup and the improved external surface of the structure, the isolator thermally isolating the mockup from the improved external surface.

16. The system of claim 12 wherein the external surface of the mockup is substantially identical in composition and color to the corresponding external surface of the structure before the structure was improved.

17. The system of claim 12 wherein the mockup has substantially the same reflectivity and emissivity as the external surface of the corresponding external surface of the structure before the structure was improved.

18. The system of claim 11 wherein the first sensor is a temperature sensor to obtain a baseline temperature value, and the second sensor is a temperature sensor to obtain a post-improvement temperature value.

19. The system of claim 18 further comprising a recording device for recording at least a value associated with the first sensor and the second sensor.

20. A method for improving a structure comprising:
obtaining auditing parameters for the structure prior to improvement;
utilizing the auditing parameters to obtain a first value that is an estimate of the energy-related expenses of the structure in an unimproved state over a period of interest;
utilizing the auditing parameters to obtain a second value that is an estimate of the energy-related expenses of the structure in a hypothesized improved state over the period of interest;
utilizing the first value and the second value to offer a customer a financial incentive to improve the structure; and
improving the structure in accordance with the hypothesized improved state;
wherein the auditing parameters include at least an external surface temperature of the structure on a known day that is used to obtain a temperature adjustment factor used to estimate the external temperature of the structure on other days to obtain the first value; and
wherein to obtain the second value an average external surface temperature of the structure in the hypothesized improved state over each day within the period of interest is assumed to be between about two and seven degrees Fahrenheit warmer than a corresponding cooling degree day value.

21. The method of claim 20 further comprising performing periodic maintenance to improved portions of the structure to ensure realization of the second value over the period of interest.

22. The method of claim 20 further comprising performing measurement and verification over at least a portion of the period of interest and providing the customer results obtained from the measurement and verification.

23. The method of claim 20 wherein the financial incentive comprises guaranteeing the customer a predetermined amount of energy-related savings over the period of interest.

24. The method of claim 20 wherein the financial incentive comprises financing costs associated with improving the structure in exchange for a percentage of energy-related savings resulting from the structure being in an improved state.

* * * * *